United States Patent [19]

Siegenthaler

[11] Patent Number: 5,099,892
[45] Date of Patent: Mar. 31, 1992

[54] PROCESS AND APPARATUS FOR THE MANUFACTURE OF AN AUTOMOTIVE TIRE BEAD

[75] Inventor: Karl J. Siegenthaler, Rome, Italy
[73] Assignee: Bridgestone/Firestone, Inc., Akron, Ohio
[21] Appl. No.: 624,437
[22] Filed: Dec. 7, 1990
[30] Foreign Application Priority Data
Dec. 22, 1989 [IT] Italy .................. 68169 A/89
[51] Int. Cl.⁵ ........................................ B21F 37/00
[52] U.S. Cl. ............................. 140/88; 245/1.5; 140/92.94
[58] Field of Search ............... 100/12, 13; 245/1.5; 140/88, 92.94, 101; 156/136, 422, 457

[56] References Cited
U.S. PATENT DOCUMENTS
464,693  12/1891  Frost .......................... 140/92.94
1,763,179  6/1930  Pierce ............................ 245/1.5

FOREIGN PATENT DOCUMENTS
0032736  7/1981  European Pat. Off. .
2133673  1/1973  Fed. Rep. of Germany .
2234224  1/1975  France .

*Primary Examiner*—Lowell A. Larson
*Attorney, Agent, or Firm*—Ernst H. Ruf

[57] ABSTRACT

A method and apparatus for manufacturing an automotive tire bead (1), whereby an annular element (2) having a substantially circular section and consisting of a coiled metal wire (3) is formed by winding the wire (3) about a mandrel (17) defining a duct (9) coiling about the annular element (2). One end of a flexible packing member (5) of heat-shrinkable material is then inserted inside duct (9), blown along the whole length of the same, cut to size, and the two ends joined to form a loop.

13 Claims, 5 Drawing Sheets

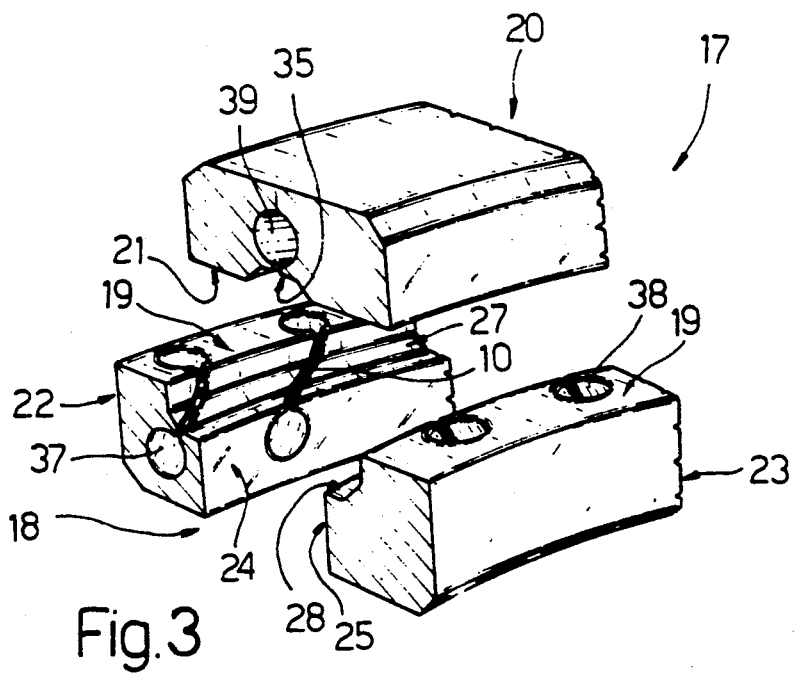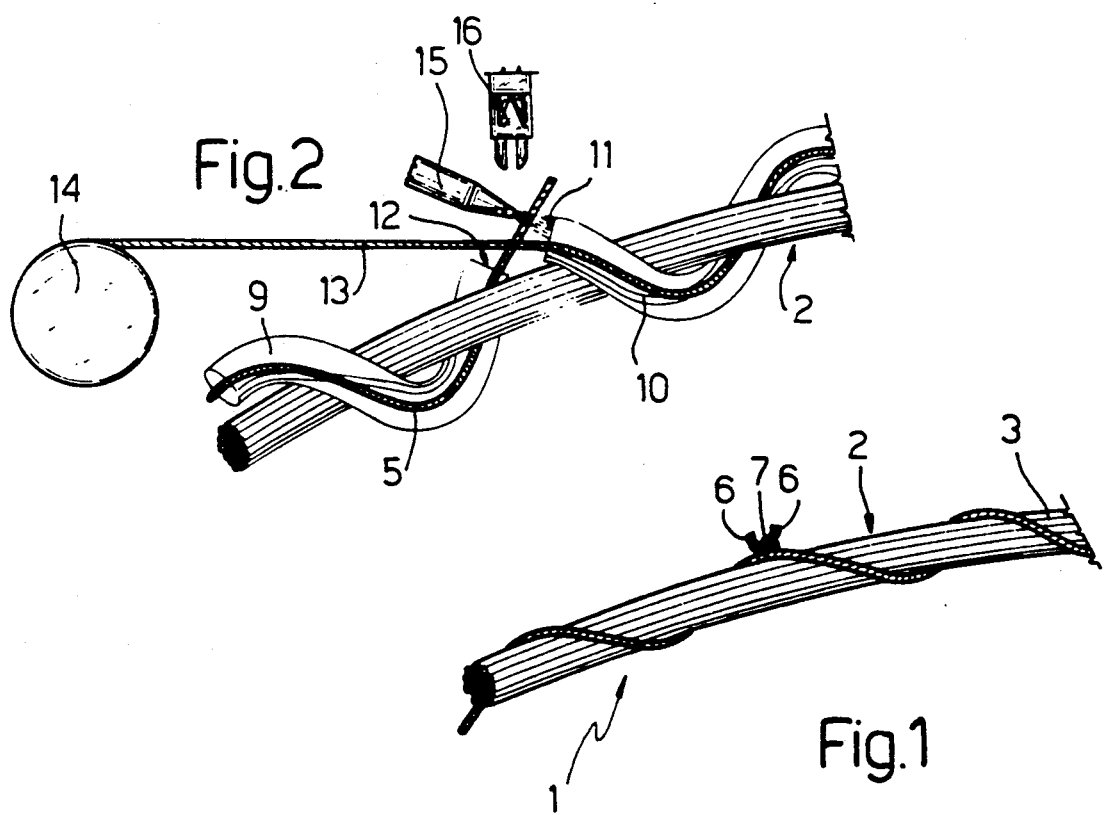

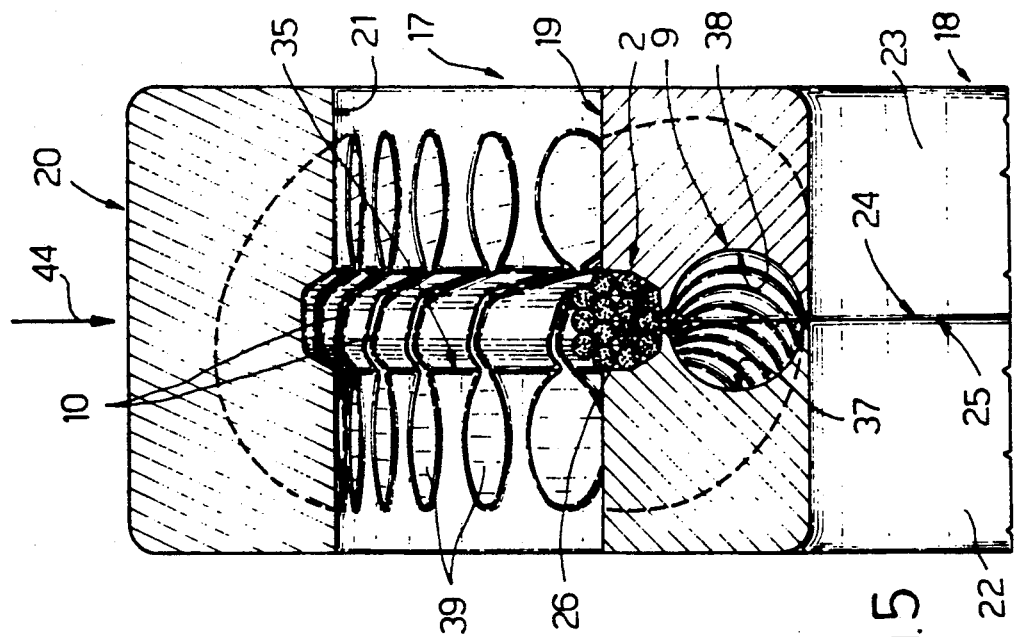
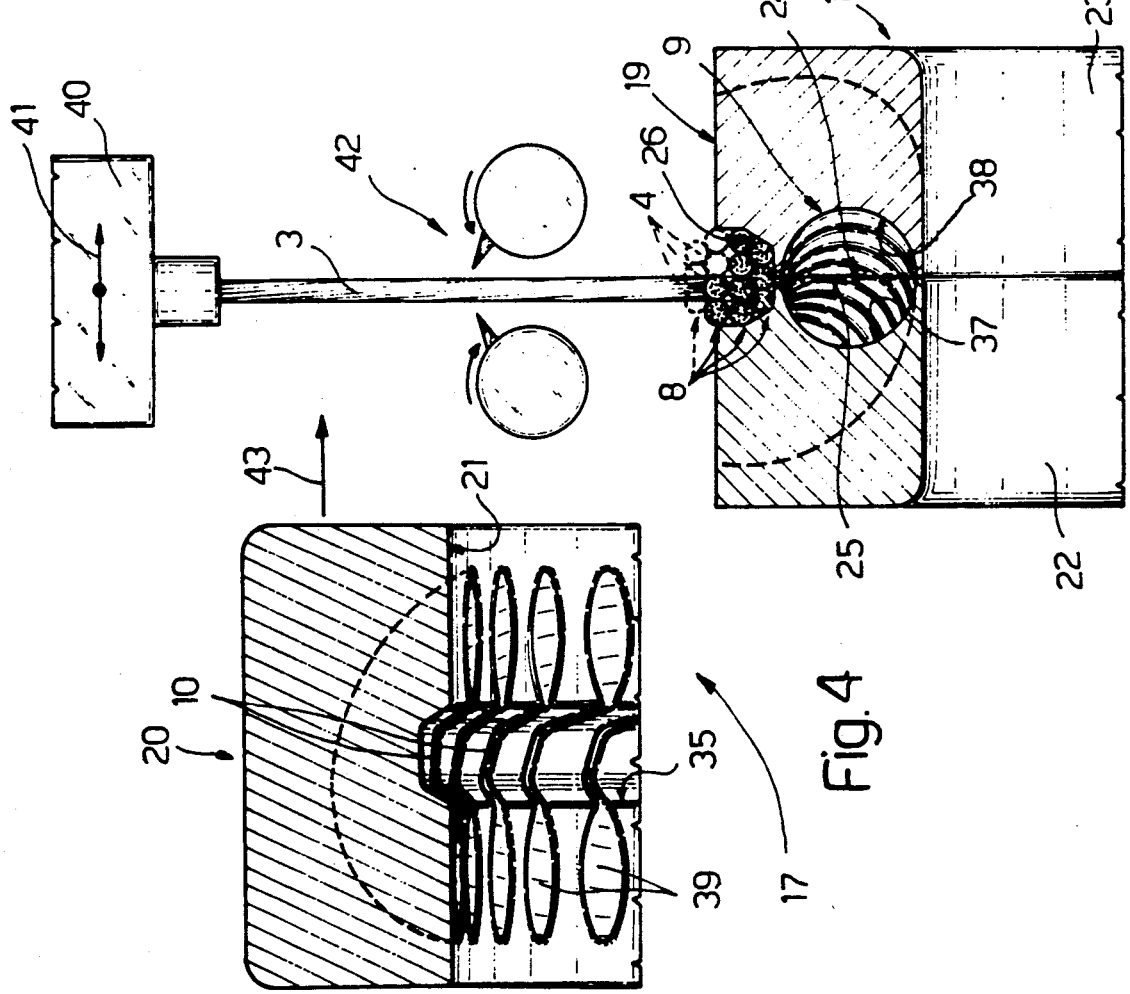
Fig. 4
Fig. 5

PROCESS AND APPARATUS FOR THE MANUFACTURE OF AN AUTOMOTIVE TIRE BEAD

TECHNICAL FIELD

The present invention relates to a process for manufacturing an automotive tire bead.

BACKGROUND OF THE ART

In particular, the present invention relates to a process for manufacturing a bead as described and claimed in Italian Patent Application No 68169/A-89 filed concurrently with the present Application, the content of which is fully incorporated herein by reference, and which relates to an automotive tire bead consisting of a substantially circular-section annular element formed from a continuous metal wire wound in such a manner as to form a number of packed coils. Said coils are arranged over the substantially circular section of said annular element according to a predetermined law, program or sequence and are held together by an outer flexible packing member of heat-shrinkable material coiled or wound about said annular element and the opposite ends of which are connected together.

DISCLOSURE OF THE INVENTION

According to the present invention, there is provided a process for manufacturing an automotive tire bead comprising a substantially circular-section annular element consisting of a number of coils packed according to a predetermined law, program or sequence and formed from a portion of a first bare wire; and a portion of a flexible packing member forming a loop and wound about said annular element; said process being characterized by the fact that it comprises stages consisting in:

a) forming said annular element by coiling said portion of said wire in the form of a circle;
b) defining a duct coiling about substantially the whole of said annular element, and having an inlet and an outlet facing each other, and a slot extending along an inner generating line of said duct and facing said annular element;
c) feeding a first end of said portion of said flexible packing member into said inlet;
d) blowing said first end along said duct and out through said outlet;
e) connecting said first end to a second end of said portion of said flexible packing member projecting from said inlet, so as to form said loop.

According to the present invention, there is also provided an apparatus for manufacturing an automotive tire bead comprising a substantially circular-section annular element consisting of a number of coils packed according to a predetermined program or sequence and formed from a portion of a bare wire; and a portion of a flexible packing member forming a loop and wound about said annular element; said apparatus being characterized by the fact that it comprises a mandrel defining both an annular seat for winding said portion of said first wire, and a duct coiling about said annular seat and presenting an inlet, an outlet, and a longitudinal slot extending between said inlet and said outlet for enabling communication between said duct and said annular seat; supply means for feeding a jet of compressed air into said duct through said inlet; and connecting means for joining the two opposite ends of said portion of said flexible packing member and so forming said loop.

A non-limiting embodiment of the present invention will now be described by way of example with reference to the accompanying drawings.

BRIEF DESCRIPTION OF THE DRAWINGS

FIG. 1 shows a partial view, in perspective, of a preferred embodiment of the bead formed using the process and apparatus according to the present invention;

FIG. 2 shows a diagram of the process for forming the FIG. 1 bead according to the present invention;

FIG. 3 shows a partial exploded view, in perspective, of a preferred embodiment of the apparatus according to the present invention, for producing the FIG. 1 bead according to the FIG. 2 process;

FIGS. 4, 5 and 6 show larger-scale, partial radial sections of the FIG. 3 apparatus in three successive operating positions;

FIG. 9 shows a similar section to that of FIGS. 4 to 6, illustrating the FIG. 3 apparatus at the final operating stage.

BEST MODE FOR CARRYING OUT THE INVENTION

Figure 6:
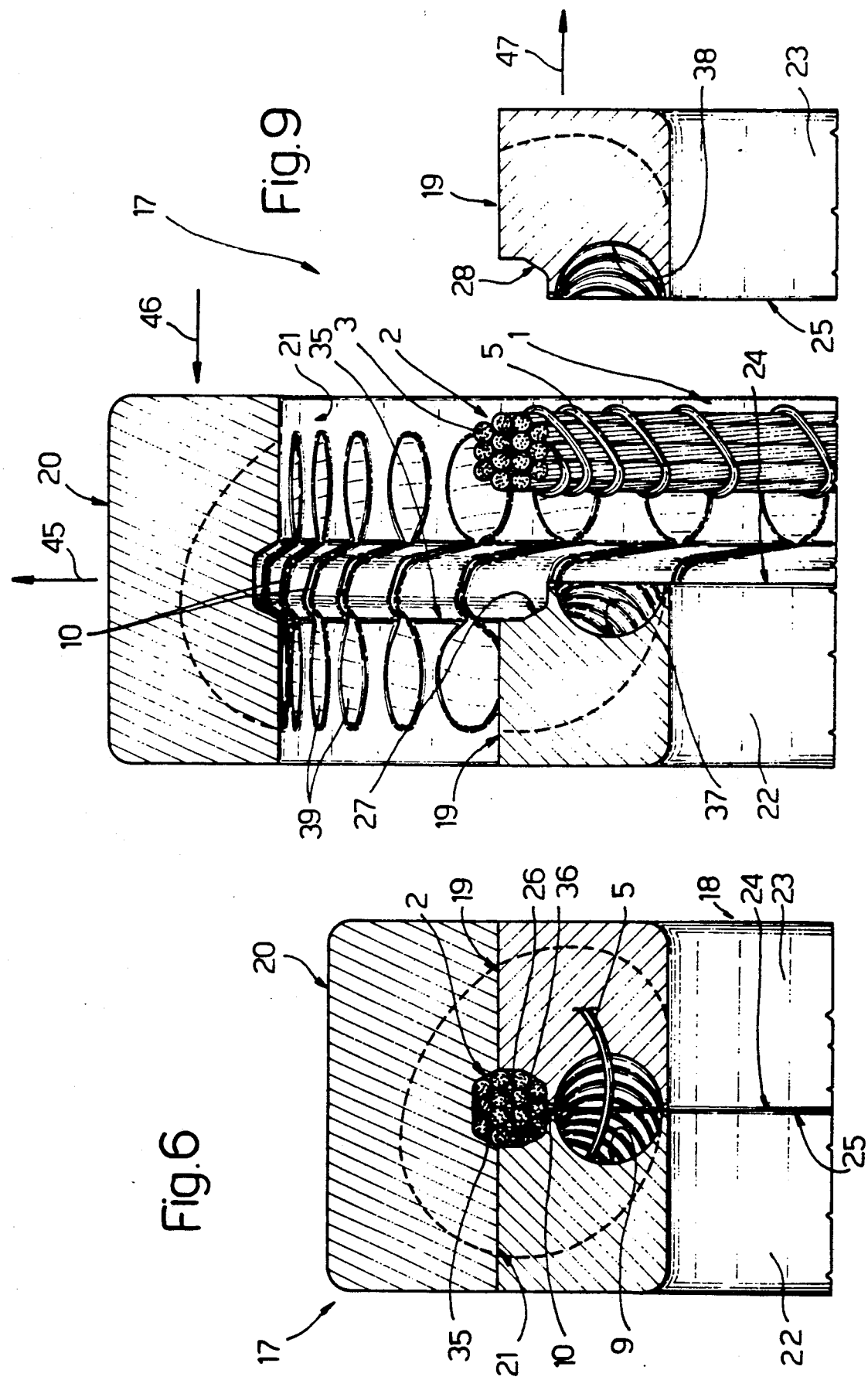

Number 1 in FIG. 1 indicates a "program" bead for an automotive tire, consisting of a substantially circular-section annular element 2 formed from a continuous bare metal wire 3 wound in such a manner as to form a number of packed coils 4 (FIG. 4). Wire 3 may consist of a solid metal wire preferably, but not necessarily, of circular section, or, preferably, as in the example shown, of a metal cable.

Coils 4 are held together by a portion of an outer flexible packing member 5 of heat-shrinkable material, e.g., polyamide, wound about annular element 2 and having two opposite ends 6 tied in a knot 7. The sections of coils 4 are arranged over the circular section of annular element 2 according to a predetermined law, sequence or "program". As shown more clearly, for example, in FIG. 4, said coils 4 are arranged in a number of superimposed layers 8, each of the intermediate layers of which comprises a greater number of coils 4 than in outer layers 8, so as to form said substantially circular section of annular element 2.

As shown schematically in FIG. 2, the process for forming bead 1 comprises stages consisting in forming annular element 2, on which is subsequently defined a duct 9 coiling about and extending over substantially the entire length of annular element 2. Duct 9 presents, along an inner generating line, a helical slot 10 facing the outer surface of annular element 2, and an interruption defining an inlet 11 and an outlet 12. The end of a continuous flexible packing member 13, preferably fed off a reel 14, is then fed through inlet 11 and "shot" into duct 9 by a jet of compressed air supplied by a nozzle 15 facing inlet 11. By virtue of said jet, the end of member 13 is fed along duct 9 and out through outlet 12. At this point, the compressed air supply from nozzle 15 is cut off and a known type of knotting device 16 activated for cutting member 13 to size and so forming said flexible packing member portion 5. At the same time, said knotting device 16 engages ends 6 of portion 5 for tying knot 7 while at the same time withdrawing portion 5 through slot 10 and onto the outer surface of annular element 2.

It should be pointed out, in connection with the above, that knotting device 16 may be of any known type, which provides solely for bringing portion 5 into contact with the outer surface of annular element 2, but not for applying a given tension to the same. Consequently, once knot 7 is tied, the tension of flexible packing member portion 5 is substantially zero, and barely sufficient to ensure a stable shape of annular element 2, but not to prevent mutual axial and transverse displacement of coils 4 when annular element 2 is twisted. When curing the finished green tire, however, the heat applied causes flexible packing member portion 5 to shrink tightly about and so pack coils 4. Knotting device 16 may, of course, be replaced by any other suitable device, e.g. a welder or splicer, for joining ends 6 in knot-free manner.

Figure 7:
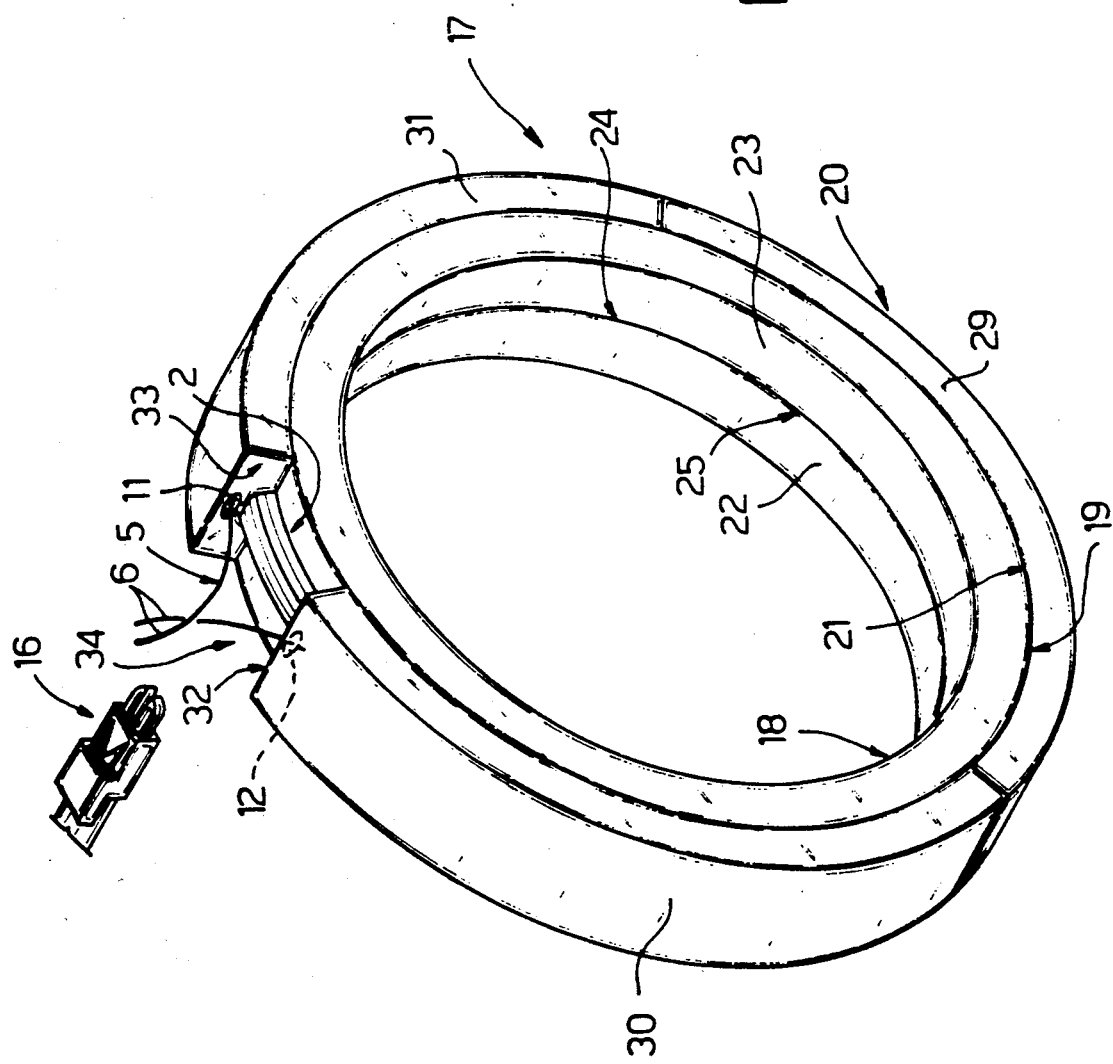
FIG. 7 shows a view, in perspective, of the FIG. 3 apparatus at a further operating stage.
Figure 8:
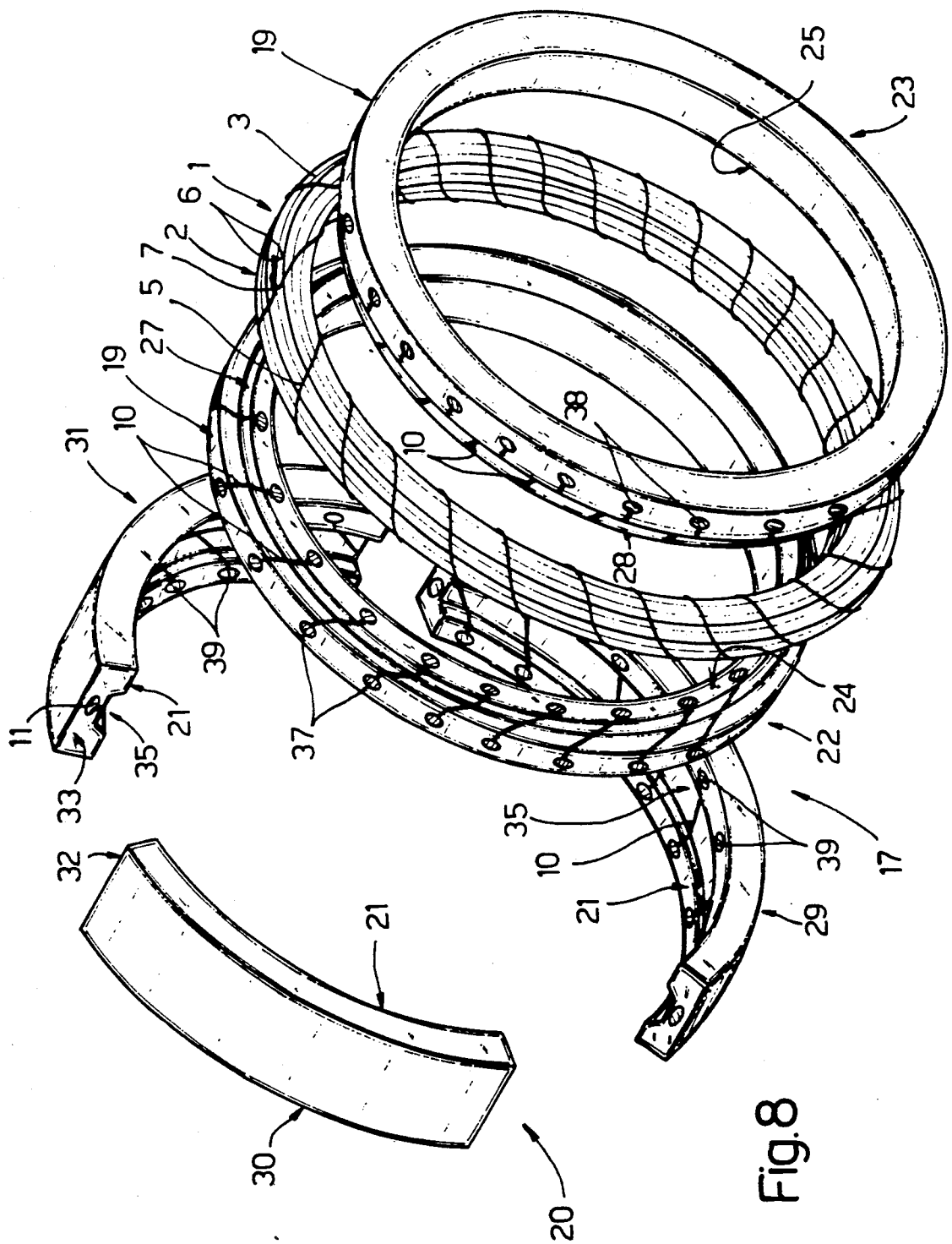
FIG. 8 shows an exploded version of FIG. 7, illustrating the FIG. 3 apparatus at yet a further operating stage.

FIGS. 3 and 4 to 8 show an apparatus consisting of a mandrel 17 enabling implementation of the process for fabricating bead 1 a described with reference to FIG. 2. As shown particularly in FIGS. 3 and 8, mandrel 17 comprises an inner ring 18 defined externally by a cylindrical surface 19, and an outer ring 20 defined internally by a cylindrical surface 21 mating with surface 19. Inner ring 18 consists of two mirror-image annular bodies 22 and 23, identical to each other in relation to the central plane of ring 18 perpendicular to the axis of the same, and along which said two annular bodies 22 and 23 are arranged contacting each other along respective flat annular surfaces 24 and 25. According to a variation not shown, the inner edges of surfaces 24 and 25 present mating tapered surfaces for ensuring correct mutual positioning of annular bodies 22 and 23.

Along surface 19 there is formed an annular groove 26 having a substantially semicircular section and the diametrical plane of which coincides with the plane of surfaces 24 and 25. In other words, a first transverse half 27 (FIG. 3) of groove 26 (FIG. 5) is formed in annular body 22, while the second half 28 (FIG. 3) is formed in annular body 23.

Outer ring 20 consists of three consecutive segments 29, 30 and 31. Intermediate segment 29 extends over an arc of approximately 120°, whereas sectors 30 and 31 extend over respective slightly narrower arcs (FIG. 7) so as to present two facing end surfaces 32 and 33 defining an annular break or opening 34. Cylindrical surface 21 of ring 20 presents an annular groove 35 having a substantially semicircular section and interrupted at opening 34. When rings 18 and 20 are placed together, grooves 26 and 35 define an annular eat 36 (FIG. 6) of substantially circular section, communicating externally via opening 34 and housing annular element 2. Duct 9 in FIG. 2 is formed along mandrel 17, together with slot 10, in such a manner as to coil about seat 36, and comprises a number of duct segments 37 formed in annular body 22, a number of segments 38 formed in annular body 23, and a number of segments 39 formed in each of segments 29, 30 and 31 of outer ring 20. In particular, two of said segments 39 terminate at respective surfaces 31 and 30, so as to define inlet 11 and outlet 12 of duct 9.

Formation of bead 1 on mandrel 17 will be described with reference to FIGS. 4 to 9. As shown in FIG. 4, to begin with, annular bodies 22 and 23 are placed together so as to define inner ring 18 together with respective groove 26. Inner ring 18 is preferably mounted on a rotary support (not shown) designed to turn ring 18 about its axis, and on which annular body 22 is fitted in a substantially fixed axial position, while annular body 23 is fitted in such a manner as to move axially in relation to annular body 22 between a working position (FIGS. 4 to 8) wherein annular surfaces 24 and 25 contact each other, and an unloading position (FIG. 9) wherein surfaces 24 and 25 are separated by a distance at least equal to the diameter of groove 26.

Wire 3, normally fed off a reel (not shown), is fed inside groove 26 via a known prior at feeding device 40 and secured, in any convenient manner, with one end contacting a given point on the surface of groove 26. Feeding device 40 is normally controlled by a computer (not shown), and moves back and forth, as controlled by said computer and according to a given or predetermined program, in direction 41 parallel to the axis of ring 18, so as to form, subsequent to rotation of ring 18 about its own axis, a number of coils 4 (FIG. 4) arranged in a number of layers 8 according to a given sequence, so as to form annular element 2, the circular section of which is substantially housed half inside and half projecting outwardly of groove 26.

As already described with reference to FIG. 2, flexible packing member 13 (FIGS. 6 and 7) is then fed into inlet 11 of duct 9, blown along duct 9 and out through outlet 12, and cut to size and tied by device 16 so as to define both knot 7 and flexible packing member portion 5 engaged inside slit 10 and coiled about annular element 2.

Once bead 1 is formed, segments 29, 30 and 31 are moved (FIG. 9) first radially outwardly in the direction of arrow 45 opposite arrow 44, and then axially in the direction of arrow 46 opposite arrow 43 back to the idle position shown in FIG. 4. At the same time, annular body 23 is moved axially in relation to annular body 22 and in the direction of arrow 47 from the work position contacting annular body 22 to the unloading position, thus enabling removal of bead 1 from annular body 22.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

What is claimed is:

1. A process for manufacturing an automotive tire bead of the type having a substantially circular-section annular element consisting of a number of coils packed according to a predetermined program or sequence and formed from a portion of a bare wire, and having a portion of an outer flexible packing member which forms a loop wound about said annular element; said process comprises the steps of:
   a) forming said annular element by coiling said portion of the bare wire in the form of a circle;
   b) providing a helical duct extending about substantially the whole of said annular element, said duct having an inlet and an outlet facing each other, and a slot extending along an inner generating line of said duct and facing said annular element;

c) feeding a first end of said portion of said outer flexible packing member into said duct inlet;

d) blowing said first end along said duct and out through said outlet of the duct; and e) connecting said first end to a second end of said portion of said flexible packing member projecting from said inlet of the duct, so as to form said loop.

2. A process as defined in claim 1 in which the first end of the flexible packing member is blown along said duct by a jet of compressed air fed into said duct through said inlet.

3. An apparatus for manufacturing an automotive tire bead of the type having a substantially circular-section annular element consisting of a number of coils packed according to a predetermined program or sequence and formed from a portion of a bare wire, and having a portion of an outer flexible packing member with opposite ends forming a loop which is wound about said annular element; said apparatus comprises a mandrel defining both an annular seat for winding said portion of said bare wire, and a duct extending helically about said annular seat terminating in an inlet and an outlet, and having a slot extending between said inlet and said outlet providing communication between said duct and said annular seat; supply means for feeding a jet of compressed air into said duct through said inlet; and connecting means for joining the opposite ends of said portion of said flexible packing member to form said loop.

4. An apparatus as defined in claim 3 in which the mandrel comprises an inner ring having a cylindrical outer surface with a first annular groove and an outer ring having a cylindrical inner surface contacting said cylindrical outer surface and having a second annular groove facing said first annular groove so as to define therewith said annular seat.

5. An apparatus as defined in claim 4 in which the duct extends through said inner ring and said outer ring; and in which said outer ring presents an annular opening, with said inlet and said outlet being formed on said outer ring at said annular opening.

6. An apparatus as defined in claim 5 in which the outer ring comprises three adjacent segments each moving both axially and radially in relation to one another and to said inner ring.

7. An apparatus as defined in claim 6 in which the inner ring comprises two mating annular bodies designed to move axially in relation to each other, and each bearing a respective portion of said first annular groove.

8. An apparatus as defined in claim 7 including means for continuously feeding said flexible packing member into said inlet.

9. An apparatus as defined in claim 8 in which the connecting means comprises a knotting device for both detaching said portion from said flexible packing member, and for knotting said opposite ends of said portion.

10. An apparatus as defined in claim 4 in which the outer ring comprises three adjacent segments each moving both axially and radially in relation to one another and to said inner ring.

11. An apparatus as defined in claim 10 in which the inner ring comprises two mating annular bodies designed to move axially in relation to each other, and each bearing a respective portion of said first annular groove.

12. An apparatus as defined in claim 10 including means for continuously feeding said flexible packing member into said inlet.

13. An apparatus as defined in claim 10 in which said connecting means comprises a knotting device for both detaching said portion from said flexible packing member, and for knotting said opposite ends of said portion.

* * * * *